United States Patent
Kim

(10) Patent No.: US 9,202,410 B2
(45) Date of Patent: Dec. 1, 2015

(54) PIXEL CIRCUIT AND ORGANIC LIGHT EMITTING DISPLAY DEVICE INCLUDING THE SAME

(71) Applicant: Samsung Display Co., Ltd., Yongin, Gyeonggi-Do (KR)

(72) Inventor: Do-Ik Kim, Yongin (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 68 days.

(21) Appl. No.: 14/059,292

(22) Filed: Oct. 21, 2013

(65) Prior Publication Data

US 2014/0168038 A1 Jun. 19, 2014

(30) Foreign Application Priority Data

Dec. 13, 2012 (KR) .......................... 10-2012-0144997

(51) Int. Cl.
*G09G 3/32* (2006.01)
*H05B 33/08* (2006.01)
*G09G 3/20* (2006.01)

(52) U.S. Cl.
CPC ............ *G09G 3/3208* (2013.01); *G09G 3/2022* (2013.01); *G09G 3/3233* (2013.01); *G09G 3/3291* (2013.01); *G09G 2300/0833* (2013.01); *G09G 2300/0842* (2013.01); *H05B 33/0896* (2013.01); *Y02B 20/342* (2013.01); *Y02B 20/343* (2013.01); *Y02B 20/346* (2013.01)

(58) Field of Classification Search
CPC ............ G09G 5/00; G09G 3/10; G09G 1/00; G09G 3/3233; G09G 3/3208; G09G 3/2022; G09G 3/3291; G09G 2300/0833; G09G 2300/0842

See application file for complete search history.

(56) References Cited

U.S. PATENT DOCUMENTS

| | | | |
|---|---|---|---|
| 2003/0107535 A1 | 6/2003 | Numao | |
| 2006/0132053 A1* | 6/2006 | Cho et al. | 315/169.3 |
| 2011/0199359 A1* | 8/2011 | Kawabe | 345/211 |

FOREIGN PATENT DOCUMENTS

| | | |
|---|---|---|
| KR | 10-0524330 B1 | 10/2005 |
| KR | 10-2006-0068538 A | 6/2006 |
| KR | 10-2010-0126529 A | 12/2010 |

* cited by examiner

*Primary Examiner* — Michael Faragalla
(74) *Attorney, Agent, or Firm* — Knobbe Martens Olson & Bear LLP

(57) ABSTRACT

A pixel circuit and organic light emitting display device using the pixel circuit are disclosed. One aspect of the pixel circuit includes an organic light emitting diode, a switching transistor configured to transfer a data signal in response to a scan signal, a storage capacitor configured to store the data signal transferred through the switching transistor, an amplifying unit configured to amplify the data signal stored in the storage capacitor to generate an amplified signal having a swing range greater than a swing range of the data signal, and a driving transistor configured to drive the organic light emitting diode in response to the amplified signal.

13 Claims, 13 Drawing Sheets

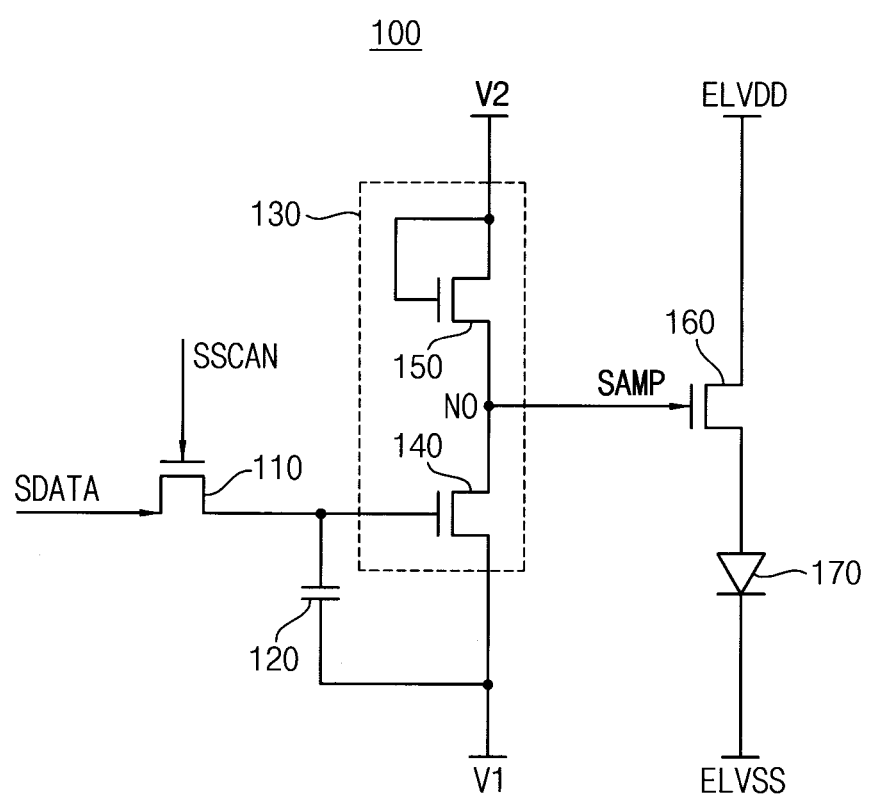

PIXEL CIRCUIT AND ORGANIC LIGHT EMITTING DISPLAY DEVICE INCLUDING THE SAME

CROSS-REFERENCE TO RELATED APPLICATIONS

This application claims priority under 35 U.S.C. §119 to Korean Patent Application No. 10-2012-0144997 filed on Dec. 13, 2012, the disclosure of which is hereby incorporated by reference herein in its entirety.

BACKGROUND

1. Field

The disclosed technology related to display devices, and more particularly, to pixel circuits and organic light emitting display devices including the pixel circuits.

2. Description of the Related Technology

Recently, various flat panel display (FPD) technologies having reduced weight and volume as compared to cathode ray tubes (CRT) have been developed. By way of example, FPDs include liquid crystal displays (LCD), field emission displays (FED), plasma display panels (PDP), and organic light emitting displays.

Organic light emitting displays display images using organic light emitting diodes (OLED) that generate light through the re-combination of electrons and holes. Organic light emitting displays have high response speed and are driven with low power consumption.

In general, an OLED display may be either a passive matrix type display (PMOLED) or an active matrix type display (AMOLED) according to a method of driving the display.

SUMMARY OF CERTAIN INVENTIVE ASPECTS

Example embodiments provide a pixel circuit capable of operating in a digital driving manner and reducing power consumption for charging and discharging a data line.

Example embodiments provide an organic light emitting display device that includes at least one pixel circuit capable of operating in a digital driving manner and reducing power consumption for charging and discharging a data line.

According to one aspect of example embodiments, there is provided a pixel circuit including an organic light emitting diode, a switching transistor configured to transfer a data signal in response to a scan signal, a storage capacitor configured to store the data signal transferred through the switching transistor, an amplifying unit configured to amplify the data signal stored in the storage capacitor so as to generate an amplified signal having a swing range greater than a swing range of the data signal, and a driving transistor configured to drive the organic light emitting diode in response to the amplified signal.

In example embodiments, the amplifying unit comprises a first transistor coupled between a first voltage source and an output node of the amplifying unit, and configured to be turned on or off according to a logic level of the data signal stored in the storage capacitor, and a second transistor coupled between a second voltage source and the output node, the second transistor being diode-connected to maintain a turned-on state.

In example embodiments, a size of the first transistor is greater than the size of the second transistor.

In example embodiments, the turn-on resistance of the first transistor may be less than the turn-on resistance of the second transistor.

In example embodiments, when the data signal stored in the storage capacitor has a first logic level, the first transistor is turned on in response to the data signal having the first logic level, and the amplifying unit divides a voltage between the first voltage source and the second voltage source based on the ratio of the turn-on resistance of the first transistor to the turn-on resistance of the second transistor, and may apply the divided voltage as the amplified signal to the driving transistor.

In example embodiments, when the data signal stored in the storage capacitor has a second logic level, the first transistor is turned off in response to the data signal having the second logic level, and the amplifying unit applies the second voltage as the amplified signal to the driving transistor through the diode-connected second transistor.

In example embodiments, the switching transistor comprises a first NMOS transistor having a first terminal to which the data signal is applied, a gate terminal to which the scan signal is applied, and a second terminal coupled to the storage capacitor.

In example embodiments, the amplifying unit comprises a second NMOS transistor having a first terminal coupled to an output node of the amplifying unit, a gate terminal coupled to the storage capacitor, and a second terminal coupled to a first voltage source, and a third NMOS transistor having a first terminal coupled to a second voltage source, a gate terminal coupled to the first terminal of the third NMOS transistor, and a second terminal coupled to the output node of the amplifying unit.

In example embodiments, the driving transistor comprises a fourth NMOS transistor having a first terminal coupled to a high power supply voltage source, a gate terminal coupled to the output node of the amplifying unit, and a second terminal coupled to the organic light emitting diode.

In example embodiments, the switching transistor comprises a first PMOS transistor having a first terminal to which the data signal is applied, a gate terminal to which the scan signal is applied, and a second terminal coupled to the storage capacitor.

In example embodiments, the amplifying unit comprises a second PMOS transistor having a first terminal coupled to an output node of the amplifying unit, a gate terminal coupled to the storage capacitor, and a second terminal coupled to a first voltage source, and a third PMOS transistor having a first terminal coupled to a second voltage source, a gate terminal coupled to the first terminal of the third PMOS transistor, and a second terminal coupled to the output node of the amplifying unit.

In example embodiments, the driving transistor comprises a fourth PMOS transistor having a first terminal coupled to the organic light emitting diode, a gate terminal coupled to the output node of the amplifying unit, and a second terminal coupled to a high power supply voltage source.

In example embodiments, the swing range of the data signal is about 5 V, and the swing range of the amplified signal is about 25 V.

According to another aspect of example embodiments, there is provided a pixel circuit, comprising a first NMOS transistor having a first terminal coupled to a data line, a gate terminal coupled to a scan line, and a second terminal, a storage capacitor having a first electrode coupled to the second terminal of the first NMOS transistor, and a second electrode coupled to a first voltage source, a second NMOS transistor having a first terminal coupled to an output node, a gate terminal coupled to the first electrode of the storage capacitor, and a second terminal coupled to the first voltage source and the second electrode of the storage capacitor, a third NMOS transistor having a first terminal coupled to a second voltage source, a gate terminal coupled to the first terminal of the third NMOS transistor, and a second terminal coupled to the output node, a fourth NMOS transistor having a first terminal coupled to a high power supply voltage source, a gate terminal coupled to the output node, and a second terminal, and an organic light emitting diode having an anode coupled to the second terminal of the fourth NMOS transistor, and a cathode coupled to a low power supply voltage source.

In example embodiments, when a data signal applied through the data line has a first logic level, the second NMOS transistor is turned on in response to the data signal having the first logic level, a voltage between the first voltage and the second voltage is divided based on the ratio of the turn-on resistance of the second NMOS transistor to the turn-on resistance of the third NMOS transistor, the divided voltage may be applied to the gate terminal of the fourth NMOS transistor.

In example embodiments, when a data signal applied through the data line has a second logic level, the second NMOS transistor is turned off in response to the data signal having the second logic level, and the second voltage is applied to the gate terminal of the fourth NMOS transistor through the third NMOS transistor.

According to still another aspect of example embodiments, there is provided a pixel circuit, comprising a first PMOS transistor having a first terminal coupled to a data line, a gate terminal coupled to a scan line, and a second terminal, a storage capacitor having a first electrode coupled to the second terminal of the first NMOS transistor, and a second electrode coupled to a first voltage source, a second PMOS transistor having a first terminal coupled to an output node, a gate terminal coupled to the first electrode of the storage capacitor, and a second terminal coupled to the first voltage source and the second electrode of the storage capacitor, a third PMOS transistor having a first terminal coupled to a second voltage source, a gate terminal coupled to the first terminal of the third PMOS transistor, and a second terminal coupled to the output node, a fourth PMOS transistor having a first terminal, a gate terminal coupled to the output node, and a second terminal coupled to a high power supply voltage source, and an organic light emitting diode having an anode coupled to the first terminal of the fourth PMOS transistor, and a cathode coupled to a low power supply voltage source.

In example embodiments, when a data signal applied through the data line has a first logic level, the second PMOS transistor is turned on in response to the data signal having the first logic level, a voltage between the first voltage and the second voltage is divided based on the ratio of the turn-on resistance of the second PMOS transistor to the turn-on resistance of the third PMOS transistor, and the divided voltage may be applied to the gate terminal of the fourth PMOS transistor.

In example embodiments, when a data signal applied through the data line has a second logic level, the second PMOS transistor is turned off in response to the data signal having the second logic level, and the second voltage source is applied to the gate terminal of the fourth PMOS transistor through the third PMOS transistor.

According to still another aspect of example embodiments, there is provided an organic light emitting display device including a pixel unit, a scan driving unit, a data driving unit, a timing control unit and a power unit. The pixel unit including a plurality of pixel circuits, each pixel circuit comprising an organic light emitting diode, a switching transistor configured to transfer a data signal in response to a scan signal, a storage capacitor configured to store the data signal transferred through the switching transistor, an amplifying unit configured to amplify the data signal stored in the storage capacitor so as to generate an amplified signal having a swing range greater than a swing range of the data signal, and a driving transistor configured to drive the organic light emitting diode in response to the amplified signal.

BRIEF DESCRIPTION OF THE DRAWINGS

Example embodiments can be understood in more detail from the following description taken in conjunction with the accompanying drawings, in which:

FIG. 1 is a circuit diagram illustrating a pixel circuit in accordance with example embodiments;

DETAILED DESCRIPTION OF CERTAIN INVENTIVE EMBODIMENTS

Figure 2A:
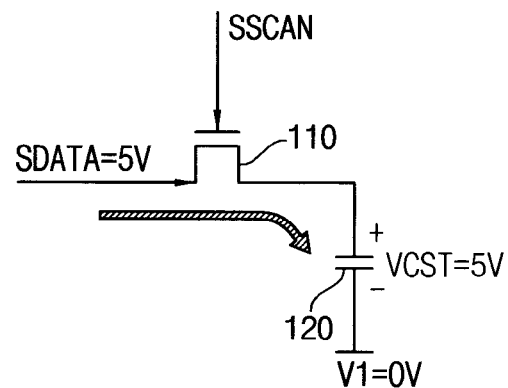
FIGS. 2A through 2C are circuit diagrams for describing an example of an operation of a pixel circuit of FIG. 1 during a subframe in which the pixel circuit does not emit light.

The example embodiments are described more fully hereinafter with reference to the accompanying drawings. The inventive concept may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like or similar reference numerals refer to like or similar elements throughout. As used herein, the term "and/or" includes any and all combinations of one or more of the associated listed items.

It will be understood that, although the terms first, second, third etc. may be used herein to describe various elements, components, regions, layers, patterns and/or sections, these elements, components, regions, layers, patterns and/or sections should not be limited by these terms. These terms are only used to distinguish one element, component, region, layer pattern or section from another region, layer, pattern or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross sectional illustrations that are schematic illustrations of illustratively idealized example embodiments (and intermediate structures) of the inventive concept. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a circuit diagram illustrating a pixel circuit in accordance with example embodiments.

Referring to FIG. 1, a pixel circuit 100 includes a switching transistor 110, a storage capacitor 120, an amplifying unit 130, a driving transistor 160 and an organic light emitting diode 170.

The switching transistor 110 transfers a data signal SDATA to the storage capacitor 120 in response to a scan signal SSCAN. In some example embodiments, the switching transistor 110 may be implemented as a first NMOS transistor 110 having a first terminal (e.g., a drain terminal) coupled to a data line to receive the data signal SDATA through the data line, a gate terminal coupled to a scan line to receive the scan signal SSCAN through the scan line, and a second terminal (e.g., a source terminal) coupled to the storage capacitor 120.

The storage capacitor 120 stores the data signal SDATA transferred through the switching transistor 110. In some example embodiments, the storage capacitor 120 may have a first electrode (e.g., a positive electrode) coupled to the second terminal of the first NMOS transistor 110, and a second electrode (e.g., a negative electrode) coupled to a first voltage V1 and a second terminal of a second NMOS transistor 140 included in the amplifying unit 130.

The amplifying unit 130 amplifies the data signal SDATA stored in the storage capacitor 120 to generate an amplified signal SAMP having a swing range greater than a swing range of the data signal SDATA. For example, the amplifying unit 130 may generate the amplified signal SAMP having the swing range of about 25 V by amplifying the data signal SDATA having the swing range of about 5 V. Since the pixel circuit 100 includes the amplifying unit 130 that amplifies the data signal SDATA, the data signal SDATA may have a relatively small swing range, and thus power consumption for charging and discharging the data line may be reduced.

In some example embodiments, the amplifying unit 130 may include the second NMOS transistor 140 coupled between the first voltage V1 and an output node NO of the amplifying unit 130, and a third NMOS transistor 150 coupled between a second voltage V2 and the output node NO of the amplifying unit 130. The second NMOS transistor 140 may be turned on or off according to a logic level of the data signal SDATA stored in the storage capacitor 120. The third NMOS transistor 150 may be diode-connected, and thus the diode-connected third NMOS transistor 150 may maintain a turned-on state. For example, the second NMOS transistor 140 may have a first terminal (e.g., a drain terminal) coupled to the output node NO, a gate terminal coupled to the first electrode of the storage capacitor 120, and a second terminal (e.g., a source terminal) coupled to the first voltage V1 and the second electrode of the storage capacitor 120, and the third NMOS transistor 150 may have a first terminal (e.g., a drain terminal) coupled to the second voltage V2, a gate terminal coupled to the first terminal of the third NMOS transistor 150, and a second terminal (e.g., a source terminal) coupled to the output node NO.

The driving transistor 160 drives the organic light emitting diode 170 in response to the amplified signal SAMP. In some example embodiments, the driving transistor 160 may be implemented as a fourth NMOS transistor 160 having a first terminal (e.g., a drain terminal) coupled to a high power supply voltage ELVDD, a gate terminal coupled to the output node NO of the amplifying unit 130, and a second terminal (e.g., a source terminal) coupled to the organic light emitting diode 170.

While the driving transistor 160 is turned on, the organic light emitting diode 170 emits light with luminance corresponding to a driving voltage applied to the organic light emitting diode 170. In some example embodiments, the organic light emitting diode 170 may have an anode coupled to the second terminal of the fourth NMOS transistor 160, and a cathode coupled to a low power supply voltage ELVSS.

In certain embodiments where the organic light emitting diode 170 is a white organic light emitting diode, a driving voltage of about 20 V is required so that the white organic light emitting diode emits light with sufficient luminance. Further, the driving transistor 160 can be an oxide thin film transistor, a gate-source voltage of about 5 V is required so that the oxide thin film transistor is turned on. Accordingly, in a conventional organic light emitting display device, a data signal applied to a pixel circuit should have a swing range of about 25 V so that the oxide thin film transistor is turned on and the white organic light emitting diode emits light with sufficient luminance. However, in an organic light emitting display device including the pixel circuit 100 according to example embodiments, since the amplifying unit 130 amplifies the data signal SDATA having the swing range of about 5 V to generate the amplified signal SAMP having the swing range of about 25 V, the data signal SDATA applied to the pixel circuit 100 may have a relatively small swing range. Accordingly, the pixel circuit 100 according to example embodiments will reduce power consumption for charging and discharging the data line. Further, the organic light emitting display device including the pixel circuit 100 according to example embodiments may employ a typical data driving unit that generates a data signal with a small swing range and/or a typical scan driving unit that generates a scan signal with a small swing range.

Hereinafter, an example of operation of the pixel circuit 100 when the pixel circuit 100 does not emit light is described with reference to FIGS. 2A through 2C.

Figure 2B:
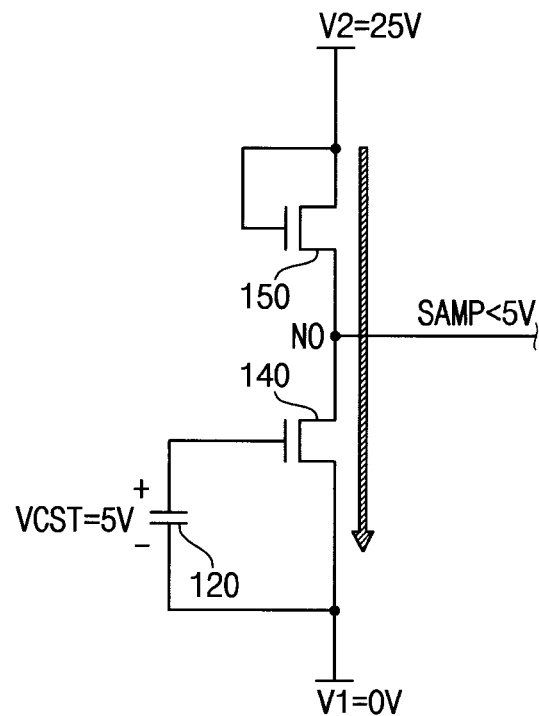
Figure 2C:
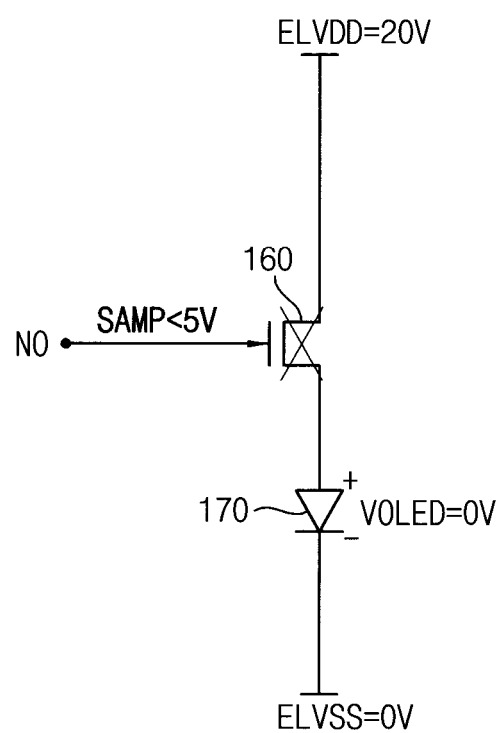

FIGS. 2A through 2C are circuit diagrams for describing an example of an operation of a pixel circuit of FIG. 1 during a subframe in which the pixel circuit does not emit light.

Referring to FIG. 2A, the first NMOS transistor 110 may transfer the data signal SDATA to the storage capacitor 120 in response to the scan signal SSCAN, and the storage capacitor 120 may store the data signal SDATA. For example, in a case where the data signal SDATA has a first logic level (e.g., a voltage level of about 5 V), a current may flow to the storage capacitor 120 through the data line and the first NMOS transistor 110, and the storage capacitor 120 may be charged to store a voltage VCST of about 5 V.

Referring to FIG. 2B, the second NMOS transistor 140 may be turned on in response to the voltage VCST of about 5 V stored in the storage capacitor 120, and the third NMOS transistor 150 may have a turned-on state since the gate terminal and the drain terminal of the third NMOS transistor 150 are coupled to each other. Thus, since both of the second and third NMOS transistors 140 and 150 are turned on, a current may flow from the second voltage V2 to the first voltage V1, and a voltage of the output node NO of the amplifying unit 130, or the amplified signal SAMP may be generated by dividing a voltage between the first voltage V1 and the second voltage V2 based on a ratio of the turn-on resistance of the second NMOS transistor 140 to the turn-on resistance of the third NMOS transistor 150. The second NMOS transistor 140 may have a size greater than that of the third NMOS transistor 150, and thus the second NMOS transistor 140 may have the turn-on resistance less than that of the third NMOS transistor 150. Accordingly, the amplified signal SAMP generated by dividing the voltage between the first voltage V1 and the second voltage V2 may have a voltage close to the first voltage V1.

In some example embodiments, an aspect ratio (W/L) of a channel width (W) to a channel length (L) of the second NMOS transistor 140 may be greater than that of the third NMOS transistor 150. Accordingly, the second NMOS transistor 140 may have the turn-on resistance less than that of the third NMOS transistor 150. For example, the aspect ratio of the second NMOS transistor 140 may be 10 times greater than the aspect ratio of the third NMOS transistor 150. In this case, the turn-on resistance of the second NMOS transistor 140 may be about one tenth of the turn-on resistance of the third NMOS transistor 150. Accordingly, in a case where the first voltage V1 is about 0V, and the second voltage V2 is about 25 V, the amplified signal SAMP generated by diving the voltage between the first voltage V1 and the second voltage V2 may have a voltage of about 2.3 V.

In other example embodiments, the second NMOS transistor 140 may include a plurality of parallel-connected NMOS transistors each having the aspect ratio (W/L) the same as that of the third NMOS transistor 150. Accordingly, the second NMOS transistor 140 may have the turn-on resistance less than that of the third NMOS transistor 150.

Referring to FIG. 2C, if the amplified signal SAMP having the voltage lower than about 5 V is applied to the gate terminal of the fourth NMOS transistor 160, the fourth NMOS transistor 160 may be turned off. Accordingly, a current does not flow from the high power supply voltage ELVDD to the low power supply voltage ELVSS, and a voltage between both ends of the organic light emitting diode 170 may be about 0V. Thus, the organic light emitting diode 170 may not emit light.

Hereinafter, an example of operation of the pixel circuit 100 when the pixel circuit 100 emits light is described with reference to FIGS. 3A through 3C.

Figure 3A:
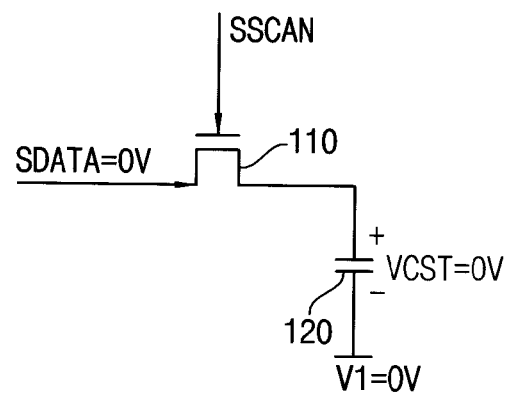
FIGS. 3A through 3C are circuit diagrams for describing an example of an operation of a pixel circuit of FIG. 1 during a subframe in which the pixel circuit emits light.
Figure 3B:
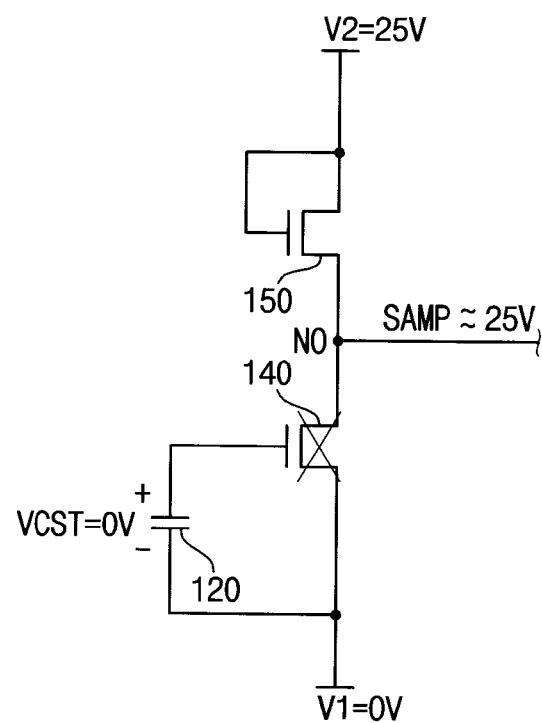
Figure 3C:
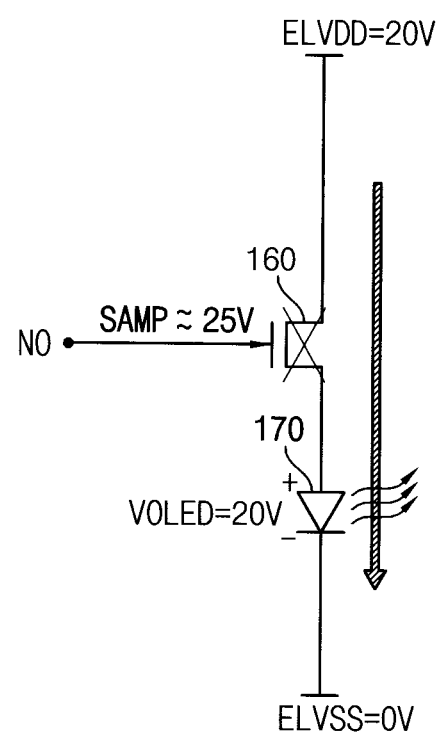

FIGS. 3A through 3C are circuit diagrams for describing an example of an operation of a pixel circuit of FIG. 1 during a subframe in which the pixel circuit emits light.

Referring to FIG. 3A, the first NMOS transistor 110 may transfer the data signal SDATA to the storage capacitor 120 in response to the scan signal SSCAN, and the storage capacitor 120 may store the data signal SDATA. For example, in a case where the data signal SDATA has a second logic level (e.g., a voltage level of about 0 V), the storage capacitor 120 may store a voltage VCST of about 0 V.

Referring to FIG. 3B, the second NMOS transistor 140 may be turned off in response to the voltage VCST of about 0 V stored in the storage capacitor 120, and the third NMOS transistor 150 may have the turned-on state since the gate terminal and the drain terminal of the third NMOS transistor 150 are coupled to each other. Thus, the amplifying unit 130 may apply the second voltage V2 as the amplified signal SAMP to the gate terminal of the driving transistor 160 through the diode-connected third NMOS transistor 150. For example, in a case where the second voltage V2 is about 25 V, the amplifying unit 130 may apply, as the amplified signal SAMP, the second voltage V2 of about 25 V minus a threshold voltage Vth of the third NMOS transistor 150 to the gate terminal of the driving transistor 160. The threshold voltage Vth of the third NMOS transistor 150 may range from about −1 V to about +1 V, and thus the amplified signal SAMP may have a voltage level close to that of the second voltage V2.

Referring to FIG. 3C, if the amplified signal SAMP having the voltage of about 25 V is applied to the gate terminal of the fourth NMOS transistor 160, the fourth NMOS transistor 160 may be turned on. Accordingly, a current may flow from the high power supply voltage ELVDD to the low power supply voltage ELVSS, and a voltage between both ends of the organic light emitting diode 170 may correspond to a voltage difference (e.g., about 20 V) between the high power supply voltage ELVDD and the low power supply voltage ELVSS. Thus, the organic light emitting diode 170 may emit light.

Although the data signal SDATA has the swing range of about 5 V, or the swing range from about 0 V to about 5 V as illustrated in FIGS. 2A and 3A, the amplified signal SAMP applied to the fourth NMOS transistor 160 may have the swing range of about 25 V, or the swing range from about 0 V to about 25 V. That is, since the amplifying unit 130 including the second and third NMOS transistors 140 and 150 amplifies the data signal SDATA having the swing range of about 5 V to generate the amplified signal SAMP having the swing range of about 25 V, the data signal SDATA having the relatively small swing range may be used to drive the organic light emitting diode 170 (e.g., the white organic light emitting diode) that requires the high driving voltage, and the power consumption for charging and discharging the data line may be reduced.

Although FIGS. 2A through 3C illustrate an example where a voltage of about 0 V is used as the first voltage V1, according to example embodiments, the first voltage V1 may be any low voltage for turning off the driving transistor 160 and the organic light emitting diode 170. In some example embodiments, the first voltage V1 may be the low power supply voltage ELVSS. For example, each of the first voltage V1 and the low power supply voltage ELVSS may be about 0 V. In other example embodiments, the first voltage V1 may be lower than the low power supply voltage ELVSS. For example, the low power supply voltage ELVSS may be about 0 V, and the first voltage V1 may be a negative voltage. In still other example embodiments, the first voltage V1 may be higher than the low power supply voltage ELVSS and lower than a predetermined voltage.

Further, although FIGS. 2A through 3C illustrate an example where a voltage of about 25 V is used as the second voltage V2, according to example embodiments, the second voltage V2 may be any high voltage for turning on the driving transistor 160 and the organic light emitting diode 170. In some example embodiments, the second voltage V2 may be the high power supply voltage ELVDD. For example, each of the second voltage V2 and the high power supply voltage ELVDD may be about 20 V. In other example embodiments, the second voltage V2 may be higher than the high power supply voltage ELVDD. For example, the high power supply voltage ELVDD may be about 20 V, and the second voltage V2 may be about 25 V. In still other example embodiments, the second voltage V2 may be lower than the high power supply voltage ELVDD and higher than a predetermined voltage.

Figure 4:
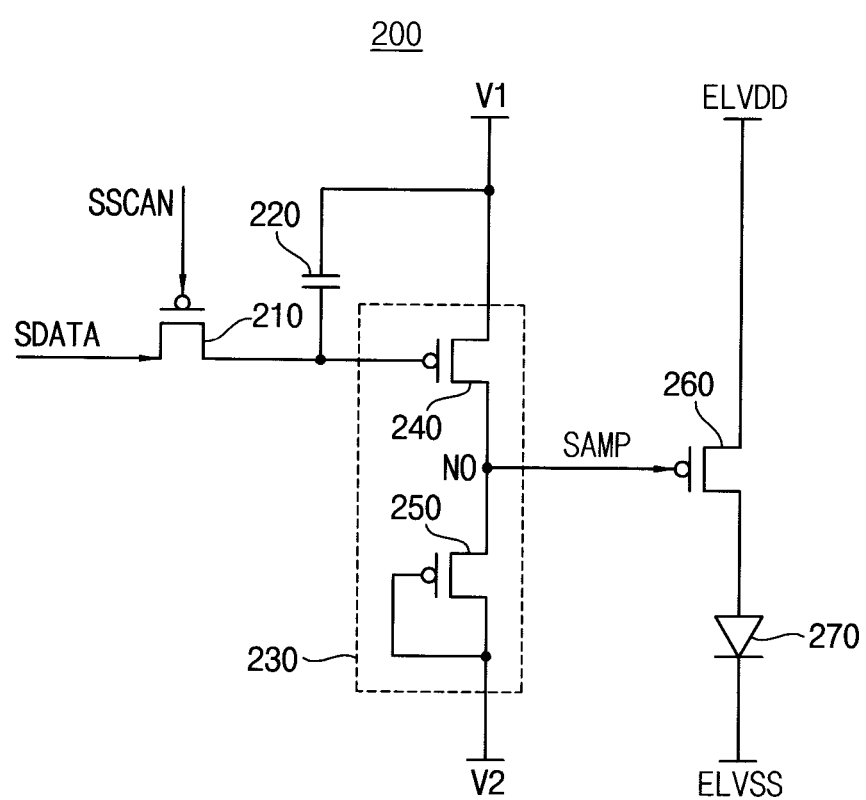
FIG. 4 is a circuit diagram illustrating a pixel circuit in accordance with example embodiments.

FIG. 4 is a circuit diagram illustrating a pixel circuit in accordance with example embodiments.

Referring to FIG. 4, a pixel circuit 200 includes a switching transistor 210, a storage capacitor 220, an amplifying unit 230, a driving transistor 260 and an organic light emitting diode 270.

The switching transistor 210 may transfer a data signal SDATA to the storage capacitor 220 in response to a scan signal SSCAN. In some example embodiments, the switching transistor 210 may be implemented as a first PMOS transistor 210 having a first terminal (e.g., a drain terminal) coupled to a data line to receive the data signal SDATA through the data line, a gate terminal coupled to a scan line to receive the scan signal SSCAN through the scan line, and a second terminal (e.g., a source terminal) coupled to the storage capacitor 220.

The storage capacitor 220 may store the data signal SDATA transferred through the switching transistor 210. In some example embodiments, the storage capacitor 220 may have a first electrode (e.g., a negative electrode) coupled to the second terminal of the first PMOS transistor 210, and a second electrode (e.g., a positive electrode) coupled to a first voltage V1 and a second terminal of a second PMOS transistor 240 included in the amplifying unit 230.

The amplifying unit 230 may amplify the data signal SDATA stored in the storage capacitor 220 to generate an amplified signal SAMP having a swing range greater than a swing range of the data signal SDATA. For example, the amplifying unit 230 may generate the amplified signal SAMP having the swing range of about 20 V by amplifying the data signal SDATA having the swing range of about 5 V. Since the pixel circuit 200 includes the amplifying unit 230 that amplifies the data signal SDATA, the data signal SDATA may have a relatively small swing range, and thus power consumption for charging and discharging the data line may be reduced.

In some example embodiments, the amplifying unit 230 may include the second PMOS transistor 240 coupled between the first voltage V1 and an output node NO of the amplifying unit 230, and a third PMOS transistor 250 coupled between a second voltage V2 and the output node NO of the amplifying unit 230. The second OMOS transistor 240 may be turned on or off according to a logic level of the data signal SDATA stored in the storage capacitor 220. The third PMOS transistor 250 may be diode-connected, and thus the diode-connected third PMOS transistor 250 may maintain a turned-on state. For example, the second PMOS transistor 240 may have a first terminal (e.g., a drain terminal) coupled to the output node NO, a gate terminal coupled to the first electrode of the storage capacitor 220, and a second terminal (e.g., a source terminal) coupled to the first voltage V1 and the second electrode of the storage capacitor 220, and the third PMOS transistor 250 may have a first terminal (e.g., a drain terminal) coupled to the second voltage V2, a gate terminal coupled to the first terminal of the third PMOS transistor 250, and a second terminal (e.g., a source terminal) coupled to the output node NO.

The driving transistor 260 may drive the organic light emitting diode 270 in response to the amplified signal SAMP. In some example embodiments, the driving transistor 260 may be implemented as a fourth PMOS transistor 260 having a first terminal (e.g., a drain terminal) coupled to the organic light emitting diode 270, a gate terminal coupled to the output node NO of the amplifying unit 230, and a second terminal (e.g., a source terminal) coupled to a high power supply voltage ELVDD.

While the driving transistor 260 is turned on, the organic light emitting diode 270 may emit light with luminance corresponding to a driving voltage applied to the organic light emitting diode 270. In some example embodiments, the organic light emitting diode 270 may have an anode coupled to the first terminal of the fourth PMOS transistor 260, and a cathode coupled to a low power supply voltage ELVSS.

As described above, the pixel circuit 200 according to example embodiments may amplify the data signal SDATA having the swing range of about 5 V to generate the amplified signal SAMP having the swing range of about 20 V, and thus may drive the organic light emitting diode 270 (e.g., a white organic light emitting diode) that requires a high driving voltage using the data signal SDATA having the relatively small swing range. Accordingly, the pixel circuit 200 according to example embodiments may reduce power consumption for charging and discharging the data line.

Hereinafter, an example of operation of the pixel circuit 200 when the pixel circuit 200 does not emit light is described with reference to FIGS. 5A through 5C.

Figure 5A:
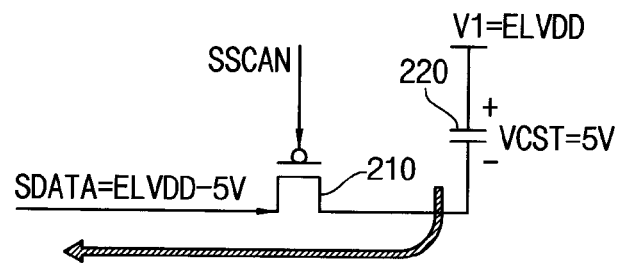
FIGS. 5A through 5C are circuit diagrams for describing an example of an operation of a pixel circuit of FIG. 4 during a subframe in which the pixel circuit does not emit light.
Figure 5B:
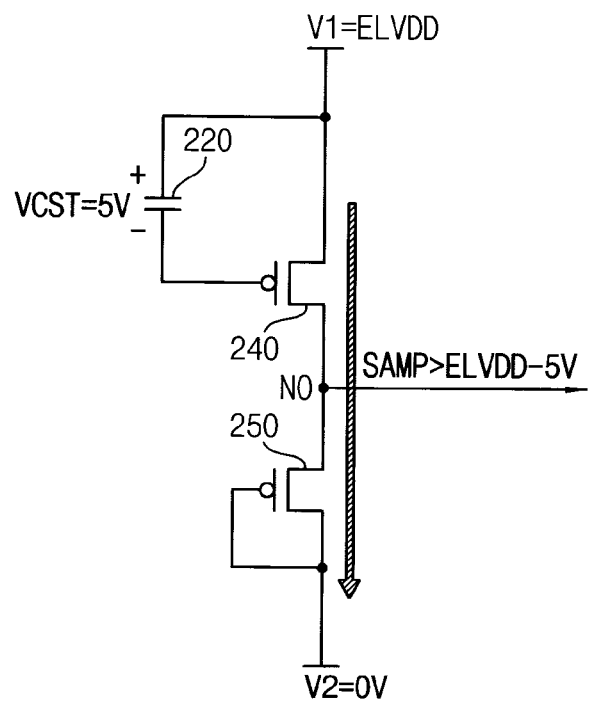
Figure 5C:
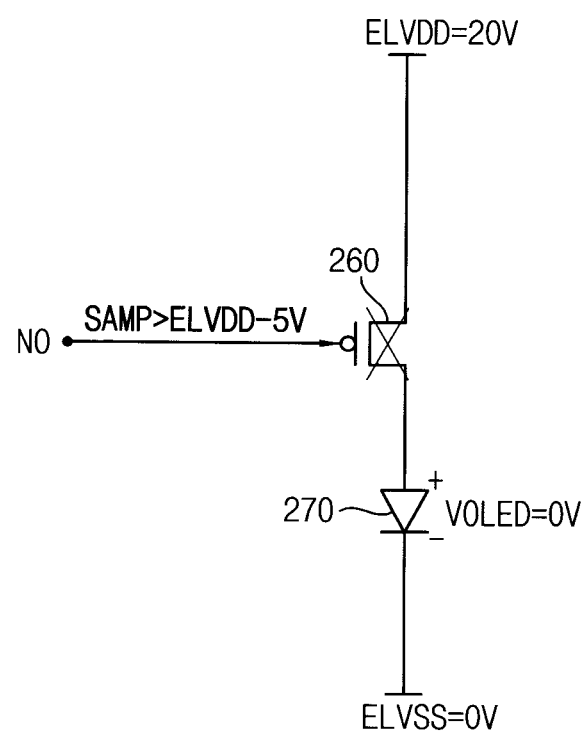

FIGS. 5A through 5C are circuit diagrams for describing an example of operation of a pixel circuit of FIG. 4 during a subframe in which the pixel circuit does not emit light.

Referring to FIG. 5A, the first PMOS transistor 210 may transfer the data signal SDATA to the storage capacitor 220 in response to the scan signal SSCAN, and the storage capacitor 220 may store the data signal SDATA. For example, in a case where the data signal SDATA has a first logic level (e.g., a voltage level of about ELVDD minus 5 V), a current may flow from the storage capacitor 220 to the data line through the first PMOS transistor 210, and the storage capacitor 220 may be charged to store a voltage VCST of about 5 V.

Referring to FIG. 5B, the second PMOS transistor 240 may be turned on in response to the voltage VCST of about 5 V stored in the storage capacitor 220, and the third PMOS transistor 250 may have a turned-on state since the gate terminal and the drain terminal of the third PMOS transistor 250 are coupled to each other. Thus, since both of the second and third PMOS transistors 240 and 250 are turned on, a current may flow from the firsts voltage V1 to the second voltage V2, and a voltage of the output node NO of the amplifying unit 230, or the amplified signal SAMP may be generated by dividing a voltage between the first voltage V1 and the second voltage V2 based on a ratio of the turn-on resistance of the second PMOS transistor 240 to the turn-on resistance of the third PMOS transistor 250. The second PMOS transistor 240 may have a size greater than that of the third PMOS transistor 250, and thus the second PMOS transistor 240 may have the turn-on resistance less than that of the third PMOS transistor 250. Accordingly, the amplified signal SAMP generated by dividing the voltage between the first voltage V1 and the second voltage V2 may have a voltage close to the first voltage V1.

In some example embodiments, an aspect ratio (W/L) of a channel width (W) to a channel length (L) of the second PMOS transistor 240 may be greater than that of the third PMOS transistor 250. Accordingly, the second PMOS transistor 240 may have the turn-on resistance less than that of the third PMOS transistor 250. For example, the aspect ratio of the second PMOS transistor 240 may be 10 times greater than the aspect ratio of the third PMOS transistor 250. In this case, the turn-on resistance of the second PMOS transistor 240 may be about one tenth of the turn-on resistance of the third PMOS transistor 250. Accordingly, in a case where the first voltage V1 is the high power supply voltage ELVDD, and the second voltage V2 is about 0 V, the amplified signal SAMP generated by diving the voltage between the first voltage V1 and the second voltage V2 may have a voltage of about 10/11*ELVDD.

In other example embodiments, the second PMOS transistor 240 may include a plurality of parallel-connected PMOS transistors each having the aspect ratio (W/L) the same as that of the third PMOS transistor 250. Accordingly, the second PMOS transistor 240 may have the turn-on resistance less than that of the third PMOS transistor 250.

Referring to FIG. 5C, if the amplified signal SAMP having the voltage close to the high power supply voltage ELVDD (e.g., a voltage higher than ELVDD minus 5 V) is applied to the gate terminal of the fourth PMOS transistor 260, the fourth PMOS transistor 260 may be turned off. Accordingly, a current does not flow from the high power supply voltage ELVDD to the low power supply voltage ELVSS, and a voltage between both ends of the organic light emitting diode 270 may be about 0V. Thus, the organic light emitting diode 270 may not emit light.

Hereinafter, an example of operation of the pixel circuit 200 when the pixel circuit 200 emits light is described with reference to FIGS. 6A through 6C.

Figure 6A:
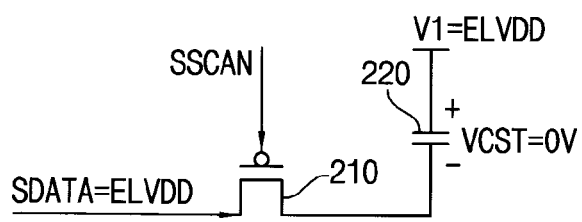
FIGS. 6A through 6C are circuit diagrams for describing an example of an operation of a pixel circuit of FIG. 4 during a subframe in which the pixel circuit emits light.
Figure 6B:
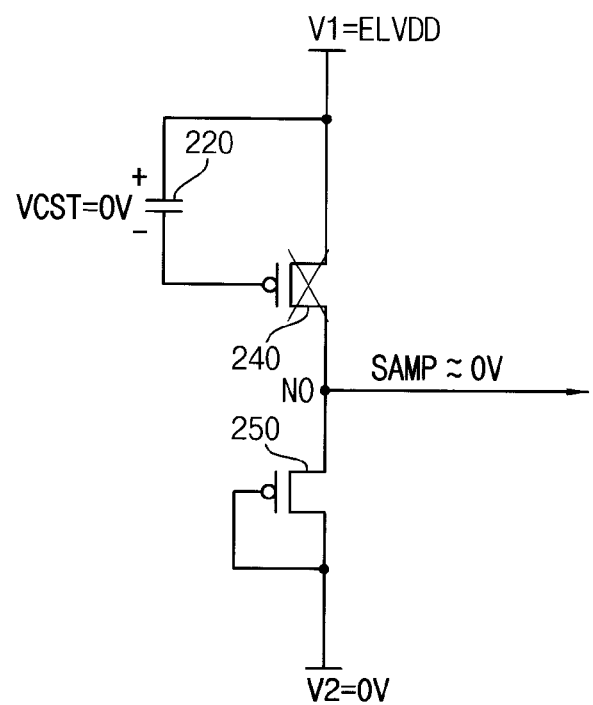
Figure 6C:
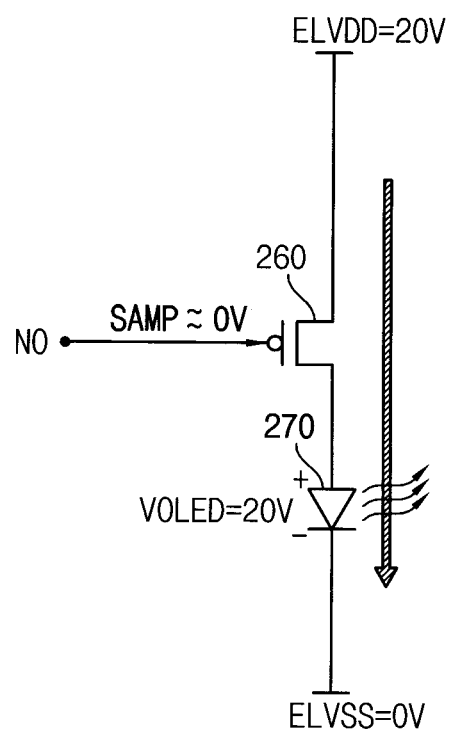

FIGS. 6A through 6C are circuit diagrams for describing an example of an operation of a pixel circuit of FIG. 4 during a subframe in which the pixel circuit emits light.

Referring to FIG. 6A, the first PMOS transistor 210 may transfer the data signal SDATA to the storage capacitor 220 in response to the scan signal SSCAN, and the storage capacitor 220 may store the data signal SDATA. For example, in certain embodiments where the data signal SDATA has a second logic level (e.g., a voltage level of ELVDD), the storage capacitor 220 may store a voltage VCST of about 0 V.

Referring to FIG. 6B, the second PMOS transistor 240 may be turned off in response to the voltage VCST of about 0 V stored in the storage capacitor 220, and the third PMOS transistor 250 may have the turned-on state since the gate terminal and the drain terminal of the third PMOS transistor 250 are coupled to each other. Thus, the amplifying unit 230 may apply the second voltage V2 as the amplified signal SAMP to the gate terminal of the driving transistor 260 through the diode-connected third PMOS transistor 250. For example, in a case where the second voltage V2 is about 0 V, the amplifying unit 230 may apply, as the amplified signal SAMP, a voltage close to about 0 V (e.g., 0 V plus a threshold voltage Vth of the third PMOS transistor 250) to the gate terminal of the driving transistor 260.

Referring to FIG. 6C, if the amplified signal SAMP having the voltage of about 0 V is applied to the gate terminal of the fourth PMOS transistor 260, the fourth PMOS transistor 260 may be turned on. Accordingly, a current may flow from the high power supply voltage ELVDD to the low power supply voltage ELVSS, and a voltage between both ends of the organic light emitting diode 270 may correspond to a voltage difference (e.g., about 20 V) between the high power supply voltage ELVDD and the low power supply voltage ELVSS. Thus, the organic light emitting diode 270 may emit light.

Although the data signal SDATA has the swing range of about 5 V, or the swing range from ELVDD minus 5 V to ELVDD as illustrated in FIGS. 5A and 6A, the amplified signal SAMP applied to the fourth PMOS transistor 260 may have the swing range of about 20 V, or the swing range from about 0 V to about 20 V. That is, since the amplifying unit 230 including the second and third PMOS transistors 240 and 250 amplifies the data signal SDATA having the swing range of about 5 V to generate the amplified signal SAMP having the swing range of about 20 V, the data signal SDATA having the relatively small swing range may be used to drive the organic light emitting diode 270 (e.g., the white organic light emitting diode) that requires the high driving voltage, and the power consumption for charging and discharging the data line may be reduced.

Although FIGS. 5A through 6C illustrate an example where the high power supply voltage ELVDD is used as the first voltage V1, according to example embodiments, the first voltage V1 may be any high voltage for turning off the driving transistor 260 and the organic light emitting diode 270. In some example embodiments, the first voltage V1 may be the high power supply voltage ELVDD. For example, each of the first voltage V1 and the high power supply voltage ELVDD may be about 20 V. In other example embodiments, the first voltage V1 may be lower than or higher than the high power supply voltage ELVDD.

Further, although FIGS. 5A through 6C illustrate an example where a voltage of about 0 V is used as the second voltage V2, according to example embodiments, the second voltage V2 may be any low voltage for turning on the driving transistor 260 and the organic light emitting diode 270. In some example embodiments, the second voltage V2 may be the low power supply voltage ELVSS. For example, each of the second voltage V2 and the low power supply voltage ELVSS may be about 0 V. In other example embodiments, the second voltage V2 may be higher than or lower than the low power supply voltage ELVSS.

Figure 7:
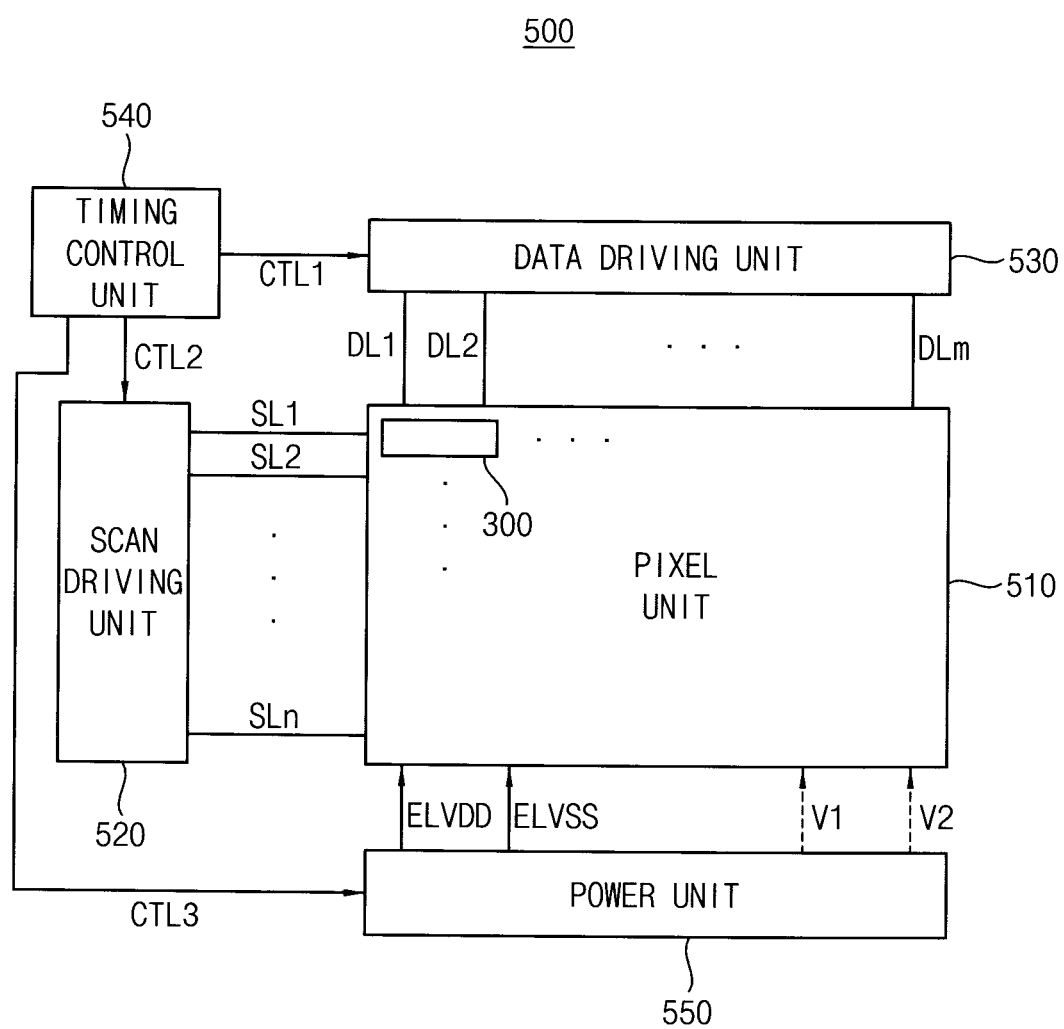
FIG. 7 is a block diagram illustrating an organic light emitting display device in accordance with example embodiments.

FIG. 7 is a block diagram illustrating an organic light emitting display device in accordance with example embodiments.

Referring to FIG. 7, an organic light emitting display device 500 includes a pixel unit 510, a scan driving unit 520, a data driving unit 530, a timing control unit 540 and a power unit 550. In some example embodiments, the scan driving unit 520, the data driving unit 530 and the timing control unit 540 may be implemented as a single integrated circuit (IC). In other example embodiments, the scan driving unit 520, the data driving unit 530 and the timing control unit 540 may be implemented as separate ICs, respectively.

The pixel unit 510 may be coupled to the scan driving unit 520 via a plurality of scan lines SL1, SL2, . . . , SLn, and may be coupled to the data driving unit 530 via a plurality of data lines DL1, DL2, . . . , DLm. The pixel unit 510 may include a plurality of pixel circuits 300. Each pixel circuit 300 may be located at crossing points of the scan lines SL1, SL2, . . . , SLn and the data lines DL1, DL2, . . . , DLm.

The pixel unit 510 may be supplied with a high power supply voltage ELVDD and a low power supply voltage ELVSS from the power unit 550. In some example embodiments, the pixel circuit 300 of the pixel unit 500 may use one of the high power supply voltage ELVDD and the low power supply voltage ELVSS as a first voltage V1 for turning off a driving transistor and an organic light emitting diode, and may use the other of the high power supply voltage ELVDD and the low power supply voltage ELVSS as a second voltage V2 for turning on the driving transistor and the organic light emitting diode. In other example embodiments, the pixel unit 510 may be further supplied with the first voltage V1 and the second voltage V2 different from the high power supply voltage ELVDD and the low power supply voltage ELVSS from the power unit 550.

The scan driving unit 520 may provide a scan signal to each pixel circuit 300 via a respective one of the scan lines SL1, SL2, . . . , SLn. The data driving unit 530 may provide a data signal to each pixel circuit 300 via a respective one of the data lines DL1, DL2, . . . , DLm.

The timing control unit 540 may control the scan driving unit 520, the data driving unit 530 and the power unit 550 by generating and providing a plurality of timing control signals CTL1, CTL2 and CTL3 to the scan driving unit 520, the data driving unit 530 and the power unit 550, respectively.

The power unit 550 may provide the high power supply voltage ELVDD and the low power supply voltage to each pixel circuit 300. The power unit 550 may further provide the first voltage V1 and the second voltage V2 to each pixel circuit 300.

Each pixel circuit 300 may be one of the pixel circuit 100 of FIG. 1, the pixel circuit 200b of FIG. 4, or the like. Each pixel circuit 100 may include an amplifying unit that amplifies the data signal having a relatively small swing range to generate an amplified signal having a relatively large swing range, and thus may drive the organic light emitting diode (e.g., a white organic light emitting diode) that requires a high driving voltage using the data signal having the relatively small swing range. Accordingly, power consumption for charging and discharging the data lines DL1, DL2, . . . , DLm may be reduces, and power consumption of the organic light emitting display device 500 including the pixel circuits 300 may be reduced.

Figure 8:
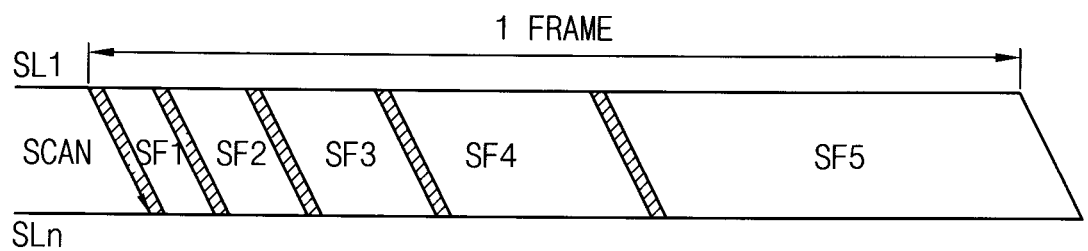
FIG. 8 is a diagram for describing an example of an operation of an organic light emitting display device of FIG. 7.
Figure 9:
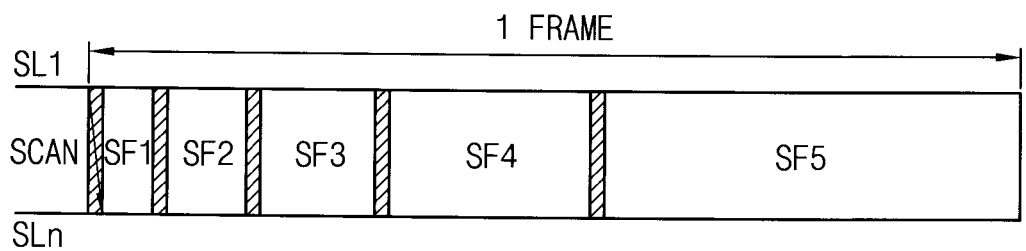
FIG. 9 is a diagram for describing another example of an operation of an organic light emitting display device of FIG. 7.

FIG. 8 is a diagram for describing an example of an operation of an organic light emitting display device of FIG. 7, and FIG. 9 is a diagram for describing another example of an operation of an organic light emitting display device of FIG. 7.

Referring to FIGS. 7, 8 and 9, the organic light emitting display device 500 may drive the pixel circuits 300 in a digital driving manner by adjusting a light emitting time. For example, one frame may be divided into a plurality of subframes SF1, SF2, SF3, SF4 and SF5, and each subframe may include a scan period (shown with oblique lines in FIGS. 8 and 9) and a light emitting period. To represent a gray level, each pixel circuit 300 may store a data signal during the scan period of each subframe, and may selectively emit light according to the stored data signal during the light emitting period of each subframe.

In some example embodiments, as illustrated in FIG. 8, the pixel circuits 300 may sequentially emit light on a scan line basis. For example, after the pixel circuits 300 coupled to a first scan line SL1 are scanned, the pixel circuits 300 coupled to the first scan line SL1 emit light while the pixel circuits 300 coupled to a second scan line SL2 are scanned.

In other example embodiments, as illustrated in FIG. 9, the pixel circuits 300 may substantially simultaneously emit light. For example, after all the pixel circuits 300 coupled to the first scan line SL1 through an n-th scan line SLn are scanned, all the pixel circuits 300 may substantially simultaneously emit light. For example, the high power supply voltage ELVDD may have a low voltage level during the scan period of each subframe, and then may transition from the low voltage level to a high voltage level to initiate the light emitting period of each subframe. In other examples, the low power supply voltage ELVSS may have a high voltage level during the scan period of each subframe, and then may transition from the high voltage level to a low voltage level to initiate the light emitting period of each subframe. This simultaneous light emitting method may be usefully applied when the organic light emitting display device 500 displays a stereoscopic image.

Figure 10:
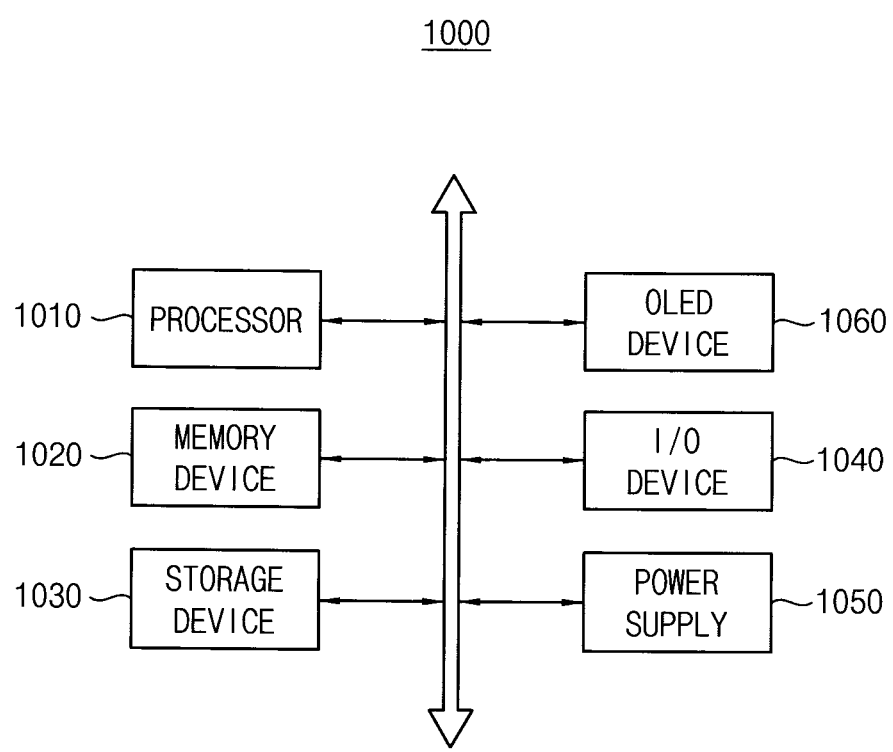
FIG. 10 is a block diagram illustrating an electronic system including an organic light emitting display device in accordance with example embodiments.

FIG. 10 is a block diagram illustrating an electronic device including an organic light emitting display device in accordance with example embodiments.

Referring to FIG. 10, an electronic system 1000 includes a processor 1010, a memory device 1020, a storage device 1030, an input/output (I/O) device 1040, a power supply 1050, and an organic light emitting display device 1060. The electronic system 1000 may further include a plurality of ports for communicating a video card, a sound card, a memory card, a universal serial bus (USB) device, other electronic systems, etc.

The processor 1010 may perform various computing functions or tasks. The processor 1010 may be for example, a microprocessor, a central processing unit (CPU), etc. The processor 1010 may be connected to other components via an address bus, a control bus, a data bus, etc. Further, the processor 1010 may be coupled to an extended bus such as a peripheral component interconnection (PCI) bus.

The memory device 1020 may store data for operations of the electronic system 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1030 may be, for example, a solid state drive (SSD) device, a hard disk drive (HDD) device, a CD-ROM device, etc. The I/O device 1040 may be, for example, an input device such as a keyboard, a keypad, a mouse, a touch screen, etc., and/or an output device such as a printer, a speaker, etc. The power supply 1050 may supply power for operations of the electronic system 1000. The organic light emitting display device 1060 may communicate with other components via the buses or other communication links.

The organic light emitting display device 1060 may be the organic light emitting display device 500 of FIG. 7. The organic light emitting display device 1060 may include a plurality of pixel circuits. Each pixel circuit may be one of the pixel circuit 100 of FIG. 1, the pixel circuit 200 of FIG. 4, or the like. Each pixel circuit may include an amplifying unit that amplifies a data signal having a relatively small swing range to generate an amplified signal having a relatively large swing range, and thus may drive an organic light emitting diode (e.g., a white organic light emitting diode) that requires a high driving voltage using the data signal having the relatively small swing range. Accordingly, power consumption for charging and discharging a data line may be reduces, and power consumption of the organic light emitting display device 1060 may be reduced.

The present embodiments may be applied to any suitable electronic system 1000 having an organic light emitting display device. For example, the present embodiments can be applied to systems such as a television, a computer monitor, a laptop, a digital camera, a cellular phone, a smart phone, a personal digital assistant (PDA), a portable multimedia player (PMP), a MP3 player, a navigation system, a video phone, etc.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A pixel circuit, comprising:
   an organic light emitting diode;
   a switching transistor configured to transfer a data signal in response to a scan signal;
   a storage capacitor configured to store the data signal transferred through the switching transistor;
   an amplifying unit configured to amplify the data signal stored in the storage capacitor so as to generate an amplified signal having a swing range greater than a swing range of the data signal; and
   a driving transistor configured to drive the organic light emitting diode in response to the amplified signal,
   wherein the amplifying unit comprises:
      a first NMOS transistor having a first terminal coupled to an output node of the amplifying unit, a gate terminal coupled to the storage capacitor, and a second terminal coupled to a first voltage source; and
      a second NMOS transistor having a first terminal coupled to a second voltage source, a gate terminal coupled to the first terminal of the second NMOS transistor, and a second terminal coupled to the output node of the amplifying unit.

2. The pixel circuit of claim 1, wherein the first NMOS transistor is configured to be turned on or off according to a logic level of the data signal stored in the storage capacitor, and the second NMOS transistor is diode-connected to maintain a turned-on state.

3. The pixel circuit of claim 2, wherein the size of the first NMOS transistor is greater than the size of the second NMOS transistor.

4. The pixel circuit of claim 3, wherein the turn-on resistance of the first NMOS transistor is less than the turn-on resistance of the second NMOS transistor.

5. The pixel circuit of claim 2, wherein, when the data signal stored in the storage capacitor has a first logic level, the first NMOS transistor is turned on in response to the data signal having the first logic level, and the amplifying unit divides a voltage between the first voltage source and the second voltage source based on the ratio of the turn-on resistance of the first NMOS transistor to the turn-on resistance of the second NMOS transistor, and applies the divided voltage as the amplified signal to the driving transistor.

6. The pixel circuit of claim 2, wherein, when the data signal stored in the storage capacitor has a second logic level, the first NMOS transistor is turned off in response to the data signal having the second logic level, and the amplifying unit applies the second voltage as the amplified signal to the driving transistor through the diode-connected second NMOS transistor.

7. The pixel circuit of claim 1, wherein the switching transistor comprises:
   a third NMOS transistor having a first terminal to which the data signal is applied, a gate terminal to which the scan signal is applied, and a second terminal coupled to the storage capacitor.

8. The pixel circuit of claim 1, wherein the driving transistor comprises:
   a fourth NMOS transistor having a first terminal coupled to a high power supply voltage source, a gate terminal coupled to the output node of the amplifying unit, and a second terminal coupled to the organic light emitting diode.

9. A pixel circuit, comprising:
   an organic light emitting diode;
   a switching transistor configured to transfer a data signal in response to a scan signal;
   a storage capacitor configured to store the data signal transferred through the switching transistor;
   an amplifying unit configured to amplify the data signal stored in the storage capacitor so as to generate an amplified signal having a swing range greater than a swing range of the data signal; and
   a driving transistor configured to drive the organic light emitting diode in response to the amplified signal,
   wherein the amplifying unit comprises:
      a first PMOS transistor having a first terminal coupled to an output node of the amplifying unit, a gate terminal coupled to the storage capacitor, and a second terminal coupled to a first voltage source; and
      a second PMOS transistor having a first terminal coupled to a second voltage source, a gate terminal coupled to the first terminal of the second PMOS transistor, and a second terminal coupled to the output node of the amplifying unit.

10. The pixel circuit of claim 9, wherein the switching transistor comprises:

a third PMOS transistor having a first terminal to which the data signal is applied, a gate terminal to which the scan signal is applied, and a second terminal coupled to the storage capacitor.

11. The pixel circuit of claim 9, wherein the driving transistor comprises:
a fourth PMOS transistor having a first terminal coupled to the organic light emitting diode, a gate terminal coupled to the output node of the amplifying unit, and a second terminal coupled to a high power supply voltage source.

12. The pixel circuit of claim 1, wherein the swing range of the data signal is about 5 V, and the swing range of the amplified signal is about 25 V.

13. An organic light emitting display device including a pixel unit, a scan driving unit, a data driving unit, a timing control unit and a power unit, the pixel unit including a plurality of pixel circuits, each pixel circuit comprising:
an organic light emitting diode;
a switching transistor configured to transfer a data signal in response to a scan signal;
a storage capacitor configured to store the data signal transferred through the switching transistor;
an amplifying unit configured to amplify the data signal stored in the storage capacitor so as to generate an amplified signal having a swing range greater than a swing range of the data signal; and
a driving transistor configured to drive the organic light emitting diode in response to the amplified signal,
wherein the amplifying unit comprises:
a first NMOS transistor having a first terminal coupled to an output node of the amplifying unit, a gate terminal coupled to the storage capacitor, and a second terminal coupled to a first voltage source; and
a second NMOS transistor having a first terminal coupled to a second voltage source, a gate terminal coupled to the first terminal of, the second NMOS transistor, and a second terminal coupled to the output node of the amplifying unit.

* * * * *